United States Patent [19]

Jensen

[11] 4,351,656
[45] Sep. 28, 1982

[54] HIGH PRESSURE FORMING BUSHING

[75] Inventor: Thomas H. Jensen, Murrysville, Pa.

[73] Assignee: PPG Industries, Inc., Pittsburgh, Pa.

[21] Appl. No.: 296,704

[22] Filed: Aug. 27, 1981

Related U.S. Application Data

[63] Continuation of Ser. No. 193,206, Oct. 2, 1980, abandoned.

[51] Int. Cl.³ .......................................... C03B 37/025
[52] U.S. Cl. .............................................. 65/1; 65/2; 65/12
[58] Field of Search ................................... 65/1, 2, 21

[56] References Cited

U.S. PATENT DOCUMENTS

| | | | |
|---|---|---|---|
| 2,947,028 | 8/1960 | Slayter | 18/8 |
| 3,328,144 | 6/1967 | Glaser | 65/11 |
| 3,573,014 | 3/1971 | Strickland et al. | 65/1 |
| 3,574,581 | 4/1971 | Strickland et al. | 65/1 |
| 3,625,025 | 12/1971 | Jensen | 65/2 |
| 3,733,188 | 5/1973 | Jensen | 65/2 |
| 3,920,430 | 11/1975 | Carey | 65/1 |

OTHER PUBLICATIONS

"The Manufacturing Technology of Continuous Glass Fibers", K. L. Loewenstein, Elsevier Scientific Publishing Co., N.Y., 1973, pp. 56-70.

Primary Examiner—Robert L. Lindsay, Jr.
Attorney, Agent, or Firm—John E. Curley

[57] ABSTRACT

A fiber glass bushing is disclosed which is formed with a corrugated bottom which provides a plurality of flat ridges on which are positioned orifices. The ridges are separated by grooves containing ceramic insulation and the bushing provided with means to support the bottom when glass is being drawn from the orifices.

22 Claims, 5 Drawing Figures

HIGH PRESSURE FORMING BUSHING

This is a continuation of application Ser. No. 193,206, filed Oct. 2, 1980 now abandoned.

BACKGROUND OF THE INVENTION

In the formation of glass fibers various bushings have been described in the prior art for forming glass fibers under high pressures. Typical of such patents are U.S. Pat. Nos. 3,573,014; 3,574,581 and 3,625,025. In the processes described in the aforementioned patents special bushing configurations generally of a tubular shape are utilized in conjunction with high pressure forming equipment such as special pumps as described in U.S. Pat. No. 3,733,188 which permit the formation of glass fibers under high pressure conditions. These processes are valuable in that fine filament fibers can be produced at considerably reduced tensions. The utilization of fiber glass bushings having a folded configuration are also shown in the aforementioned U.S. Pat. No. 3,574,581.

While processes such as those described in the prior art permit the skilled artisan to produce fibers from molten glass under pressurized conditions some difficulties are encountered in utilizing these processes because of the necessity to adapt the specialized equipment described in these patents to a conventional glass fiber forming forehearth. Thus in a normal fiber glass operation a glass melting device or furnace is provided which is utilized to melt the glass batch ingredients into molten glass form. The molten glass then in a conventional operation flows from the furnace area through a small refining area into an elongated forehearth which may take any one of several configurations in a fiber glass direct melt operation. A direct melt system is one in which the glass batch ingredients are melted in a single furnace and fed to an elongated forehearth to which several glass fiber forming bushings are attached. Special adaptations of the forehearth are required in order to permit operations utilizing the high pressure pumping equipment and special configuration bushings which are described in the aforementioned patents. Typical forehearths of the character utilized in industry today as described in the publication "The Manufacturing Technology of Continuous Glass Fibers" by K. H. Loewenstein, Elsevier Scientific Publishing Company, New York, 1973 at pages 61–70.

Thus, a need still exists in the industry for the production of fibers under pressures from a conventional direct melt forehearth which will enable one skilled in the art to utilize conventional direct melting and forehearth technology while still providing the advantages inherent in the production of glass fibers under pressure such as has been described by the prior art in the aforementioned U.S. Patents. In accordance with the instant invention a fiber glass forming bushing is provided which permits the utilization of fiber glass bushings in conventional forehearths utilizing either pumping means or other methods of applying pressure to the glass for the production of glass filaments under high pressure.

The Present Invention

In accordance with the present invention a glass fiber bushing is provided which is suitable for use in producing glass from molten glass sources which are maintained under high pressures, i.e., pressures exceeding 1 psi across the bushing face plate preferably 5 to 25 psi or higher which comprises a bushing face plate having a generally corrugated configuration. The corrugated configuration is provided with a plurality of ridges and grooves. The ridges provided on the corrugated face plate are flattened at their edges to provide across the plane of the bushing itself when it is in place a plurality of flat plate areas on which are positioned at least two rows of staggered holes or orifices which are provided with suitable tip arrangements in the manner of the conventional bushing. Located between the ridges in the grooves formed by the corrugated surface of the bushing face plate is inserted a castable refractory cement. Each ridge is preferably spaced equidistant from the next adjacent ridge. Thus, in completed form the bushing is comprised of a plurality of ridges from which bushing tips protrude and located between each row of protruding bushing tips is a castable refractory material which effectively separates the one ridge with a row or rows of bushing tips from the next adjacent ridge with a row or rows of bushing tips. Means are provided in accordance with the instant invention to maintain the bushing refractory intact between the grooves and to firmly affix cooling members to the surface of the bushing but in an insulated area so that no shorting of the bushing will occur. In providing the assembly of the instant invention special attention is made to the adaptation of the glass source to the bushing so that conventional shaped rectangular and/or square fiber glass bushings can be employed in connection with the high pressure forming process and extremely close spacing of the bushing tips can be achieved to provide a high tip density to the bushing while at the same time providing for sufficient strength characteristics to the bushing to prevent sagging especially when bushing tips of large number such as 1,200 to 2,400 or even 4,000 tips or more are employed.

BRIEF DESCRIPTION OF THE DRAWINGS

The invention will be more readily understood by reference to the accompanying drawings in which.

DETAILED DESCRIPTION OF THE DRAWINGS

Figure 1:
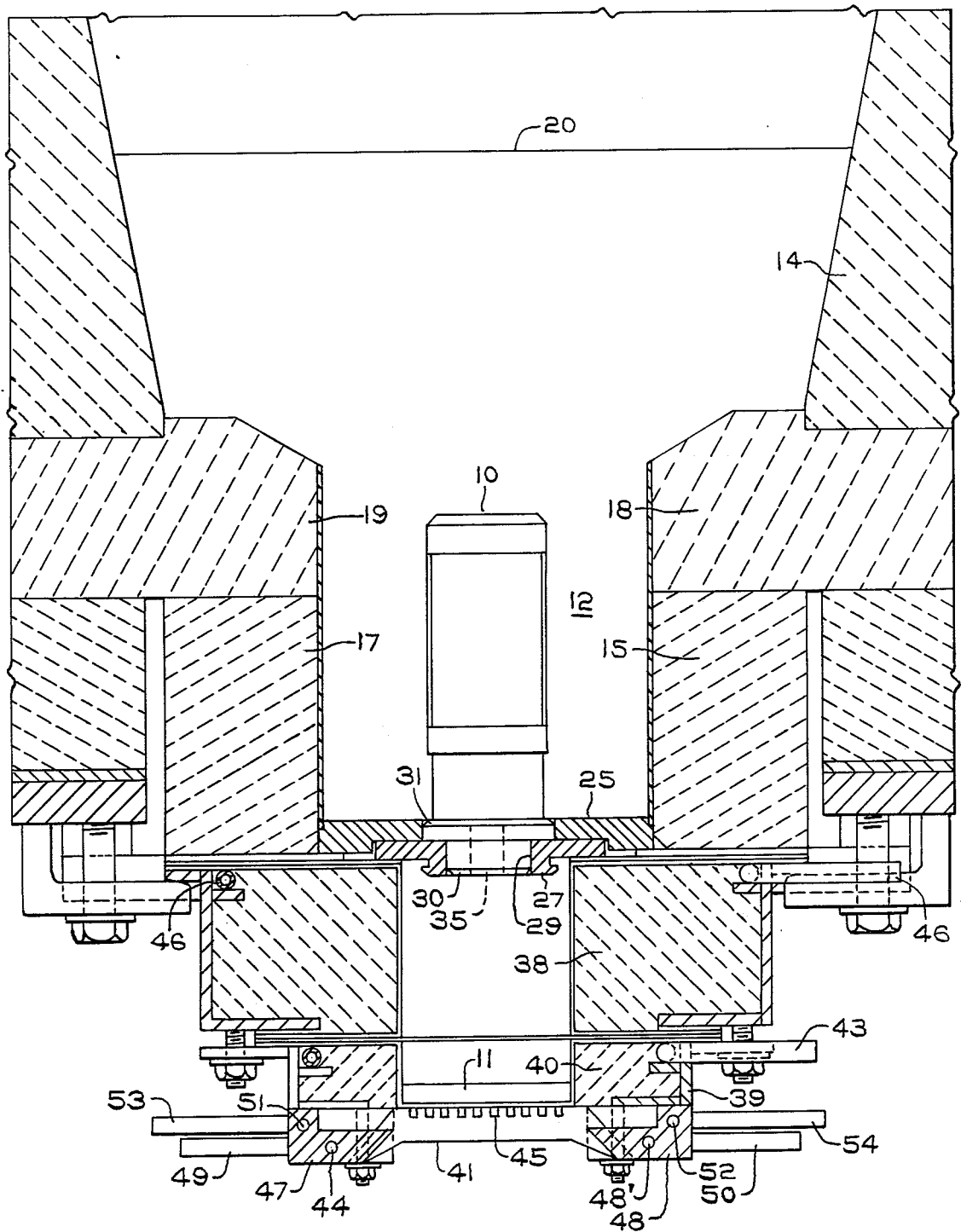
FIG. 1 represents a side view of the glass fiber forming bushing of the instant invention showing the configuration of the forehearth and a high pressure pump in place above the bushing with the associated fin cooler being in position.
Figure 2:
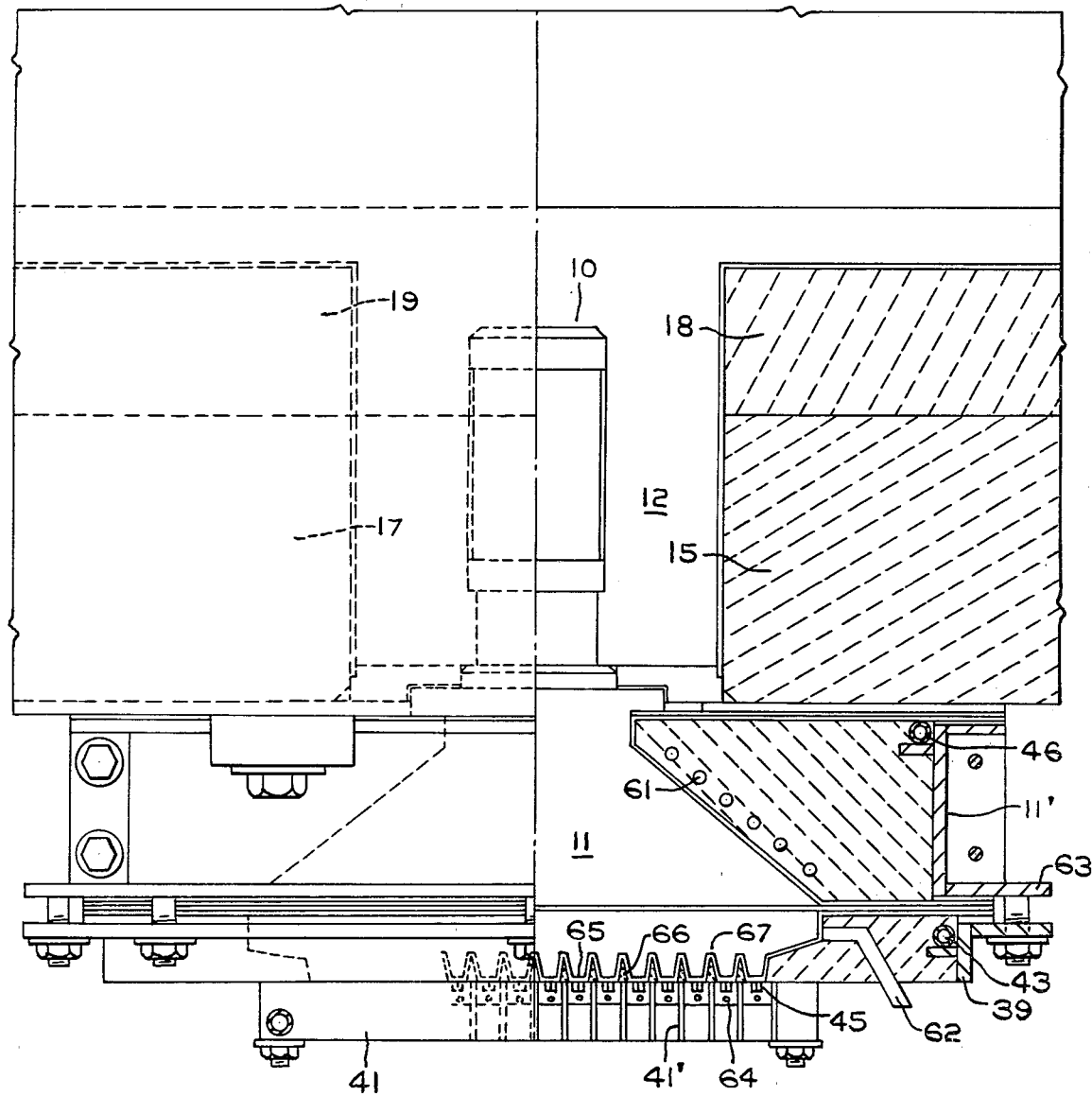
FIG. 2 is a front-elevation partially in section to show the configuration of the bushing and the positioning of the fins of the associated fin cooler and the adaptation of the upper portion of the bushing to the flow block of the forehearth.

Turning to the FIGURES, FIGS. 1 and 2 in particular, a fiber glass forming position is shown utilizing a high pressure pump 10 to deliver glass to a glass forming bushing generally indicated at 11. A suitable pump for this purpose is shown in my U.S. Pat. No. 3,733,188. The glass pump 10 is located in a recess 12 formed in the ceramic forehearth 14 by ceramic block 15 and a ceramic flow block 18. Flow block 18 is slanted in a downward fashion to provide for ease of flow of the molten glass contained in the forehearth 14 which is indicated by the level line 20. Fixed to the block 15 is a flange member 25 which mates with a similar flange member 27 located below it. Flange 27 is provided on the interior portion with a threaded opening 29 which mates with the male threads of a threaded collar 30 which is attached to the bottom of the pump 10. A flange 31 is located above the threaded member 29 to seal the pump to the lower flange 27. The pump is provided with a central opening 35 which delivers glass to the interior of the bushing 11. The bushing 11 is surrounded by a castable refractory 38 and the bushing itself is held in place by a bushing frame 39. The bushing and the frame are insulated from each other by suitable castable refractory 40 in a conventional manner. Located below the bushing 11 and affixed to the bushing 11 in a manner to be described hereinafter is a fin cooler assembly 41. Dropping from the bushing are a plurality of bushing tips 45 through which molten glass exits the bushing 11 to a suitable conventional attenuation apparatus such as a winder located below the bushing but not shown in the drawing.

As in any conventional bushing, the flange connection surrounding the bushing 11 is cooled with a cooling coil 43 and the adaptor flange 63 is similarly cooled with a cooling coil 46. The manifolds 48 and 47 for the coolers 41 are provided with internal passages or ducts 48' and 47' respectively through which cooling fluid is passed via inlet lines 50 and 49 respectively. The exit pipes (not shown) for the cooling fluid are located on the opposite side of the bushing 11 for the removal of fluid introduced through the inlets 50 and 49. Also provided in the manifolds 47 and 48 are duct members 51 and 52 which are connected to suitable gas inlet lines 53 and 54 respectively. The purpose of the gas manifolds 51 and 52 will be described hereinafter more fully in connection with FIG. 2.

Turning to FIG. 2 which is a front elevation of the bushing of FIG. 1 it will be readily seen that the bushing adapter 11' is sloped in a vertical direction from the bottom towards the top and positioned in the adaptor are suitable heating coils 61 which are utilized to electrically maintain the glass at a desired temperature during passage of glass from pump 10 to bushing 11. The terminal clamp of the bushing is shown at 62 and bolted flange member 63 is provided to affix the bushing frame 39 to the adaptor frame 11'. It will be noted in FIG. 2 that below the bushing tips 45 are located a plurality of small apertures 64 which run the length of the bushing and a single aperture is provided between each of the fin cooler blades 41' of the fin cooler 41. Located between the ridges 65 of the bushing face plate are grooves 67 which have placed in them a castable ceramic 66 to effectively insulate the bushing thermally and electrically from the supporting fins against which the bushing tip plate rests as well as to isolate each row or rows of tips from each other. The fin cooler blades 41' are provided with suitable vertical extensions that rest on the ceramic 66 contained in the grooves 67 to provide for a firm support for the bushing face plate across the plate and, since the fin members 41' connected to the fin cooler 41 are anchored in place by two manifolds 47 and 48, a firm attachment of the fin cooler blades 41' provides vertical support to the bottom of the bushing during operation to permit operation at high temperatures even though the tip density of the bushing itself is extremely high compared to a conventional bushing.

Figure 3:
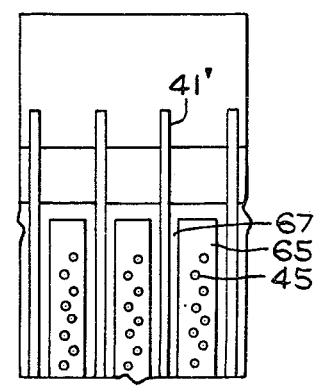
FIG. 3 is a plane view of the bottom of the bushing shown in FIGS. 1 and 2 to show in general the configuration of the bushing tips located on the face plate of the bushing at the flat portion of the ridges formed by the corrugated sheet bottom.

Turning to FIG. 3 which is a plan view of the bushing face plate looking upward into FIG. 2, partially from one end, it will be seen that each of the ridges 65 contain rows of orifices or tips 45. In this embodiment the tips are staggered along the long axis of the ridge 65 to provide a double row of tips for each ridge 65. Positioned between the ridges is the ceramic 66 which fills the grooves 67 formed by the corrugated bottom of the bushing 11 with the fin cooler blades 41' resting upon the ceramic 66 to provide the vertical support to the bushing necessary to withstand the pressures of the molten glass being exerted downwardly on the bushing face plate.

Figure 4:
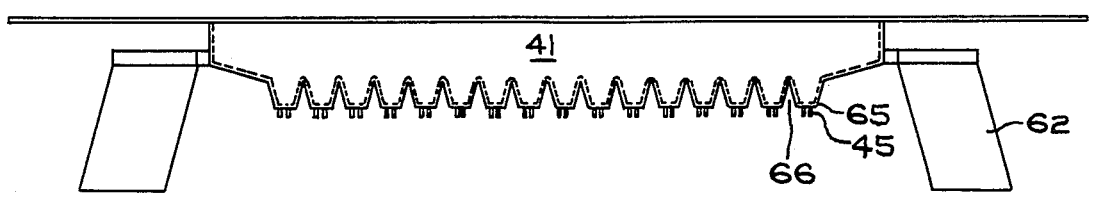
FIG. 4 is a front elevation of a bushing bottom of the type shown in FIG. 2.
Figure 5:
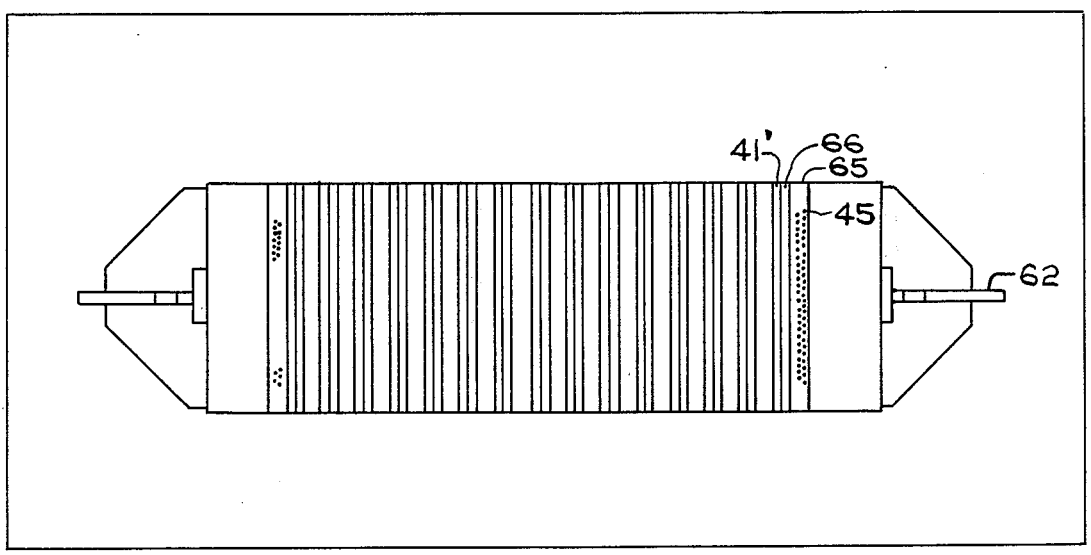
FIG. 5 is a plan view of the bushings of FIG. 4.

FIG. 4 shows the bushing 41 without the surrounding hardware. The tips 45 are positioned on the ridges 65. The bushing ears or terminals 62 are shown affixed to the bushing. In FIG. 5 the bushing terminals 62, ridges 65, tips 45, castable ceramic 66 in grooves 67 and fins 41' of the fin cooler 41 are shown in plan view.

In the operation of the bushing of the instant invention utilization is made of the air manifolds 51 and 52 shown in FIG. 1 to provide for a gentle cooling of the bushing face plate during operation and especially during breakouts or doffing of packages being run from the bushing position. During the operation of the bushing if it is desired to cool the attenuating zone during operation to maintain it at a temperature level such that overheating does not occur air is introduced to the air manifolds 51 and 52 through inlets 53 and 54 respectively. The air is distributed along the manifolds 51 and 52 and exits the manifolds through the individual openings 64 located between the fin members 41' of the fin cooler assembly 41. Preferably a screening material such as wire mesh, steel wool or the like is inserted in a small recess located immediately in front of the orifices 64 or along the length of the manifold to disperse the air introduced through the inlet 64 to prevent channeling thereon and to distribute the air uniformly across the ridges 65 which contain the orifice tips 45 to provide a gentle cooling action during the formation of fibers. When the bushing position is shut down and fibers are being drawn through it slowly during a doffing operation, for example, the bushing has a tendency to increase in temperature. At times when this occurs the air introduced through the manifold members 53 and 54 can be increased substantially to provide a further cooling to the glass cones to maintain the glass at a suitable viscosity so that the position can be restarted without severe changes occurring in the viscosity of the glass and the attendant problems created thereby.

While in the drawing a viscosity pump 10 is shown as the pressure source for applying pressure to molten glass in connection with the bushing of the instant invention, recourse may be had to other means of applying pressure, for example, standpipes can be employed which have sufficient height to deliver glass at a hydrostatic head of glass such that pressure drops across the orifices 45 exceed 1 pound per square inch and preferably are in the range of 5 to 25 psig or higher. A suitable arrangement for utilizing a standpipe configuration rather than the pump 10 of FIGS. 1 and 2 of the instant drawings are described in details in my co-pending application U.S. Ser. No. 193,194 filed Oct. 10, 1980, now U.S. Pat. No. 4,344,785 issued Aug. 17, 1982. Further in connection with the ridges 65 formed in the bottom of the face plate the preferred embodiment of the instant invention utilizes two rows of bushing tips 45. While this forms the preferred embodiment of the instant invention it is not limiting in any way since a single row of bushing tips 45 can be employed on a given ridge of a given width or multiple rows of staggered tips can be employed so long as adequate spacing between individual tips so provided, generally on the order of 0.060. There is no limitation on the rows except the spacing provided by the width of the ridge itself and the diameter of the hole utilized to produce a given fiber.

It is an important consideration of the instant invention that the fin cooler assembly be connected to the bushing bottom in such a manner that adequate support of the bushing bottom is provided through the fins 41' of the fin cooler assembly 41. Thus, it is an important consideration that the bushing manifolds 48 and 47 be clamped to the bushing frame and that the fins 41' run between both manifolds so that support is provided through the clamping of the fin cooler assembly 41 to the bushing frame.

To illustrate the advantages of the present high pressure bushing utilizing a corrugated shaped bottom with ridges and grooves being provided and the staggered tip configuration being provided on those ridges a conventional 2,000 hole bushing utilizing conventional practices in the art normally provide a tip density of 25 tips per square inch. Utilizing the ridges and groove configuration of instant invention tip densities of between 75 to 100 tips per square inch are readily achieved.

Bushings utilized in accordance with the instant invention are fabricated of platinum or platinum rhodium alloy. Similarly the fin coolers utilize conventional metals such as copper, and the fin blades 4 usually are constructed of a heat transfer material such as copper and may be coated or plated with nickel in accordance with conventional practices in the art. The castable cements utilized in the spaces formed by the grooves in preparing the bushing face plate are conventional castable refractories utilized in industry in cementing bushings into bushing frames.

While the invention has been described with reference to certain specific embodiments it is not intended that the invention be limited thereby except insofar as appears in the accompanying claims.

I claim:

1. A fiber glass forming bushing comprising a container for molten glass having a corrugated bottom forming a plurality of ridges and grooves, said ridges having a generally flat surface and said grooves forming a space between adjacent ridges, each ridge being spaced equidistant from the next adjacent ridge, insulating material filling each of said grooves, orifices positioned on said ridges and projecting therefrom, said orifices being in communication with the interior of said container to thereby permit molten glass to pass from said container through said orifices by gravity and means to connect said bushing to a molten glass source and means external of the bushing and in contact with said insulating material to provide mechanical support to the bottom of the bushing.

2. The bushing of claim 1 wherein the ridges contain at least two rows of bushing tips, the rows being staggered.

3. The bushing of claim 1 wherein the means to reinforce the bottom of the bushing are flat plate blades of a fin cooler.

4. The bushing of claim 1 wherein said bushing is flared from the bottom to the top to its point of attachment to the molten glass source.

5. The bushing of claim 1 wherein means are provided to provide a constant supply of gaseous fluid on the upper surfaces of said support member.

6. A fiber glass forming bushing suitable for high pressure forming comprising a container for molten glass, said container being provided with a corrugated bottom forming a plurality of ridges and grooves thereon, said ridges being closely spaced one from the other and equidistant from each other, means in said grooves thermally insulating each of said ridges from the ridges adjacent thereto, a plurality of orifices projecting from each of said ridges, said orifices being arranged in rows and in fluid communication with the interior of said container to thereby permit glass to flow from said container and through said orifices, means to connect said container to a high pressure source of molten glass, and means to support the corrugated bottom of said bushing.

7. The bushing of claim 6 wherein the ridges have at least two rows of orifices.

8. The bushing of claim 7 wherein said orifices have a tip projecting therefrom.

9. The bushing of claim 6 wherein said orifices have tips projecting therefrom.

10. The bushing of claim 6 wherein the means to support said corrugated bottom is a fin cooler.

11. The bushing of claim 6 wherein said support means also provides gaseous coolant to said bushing.

12. A fiber glass forming bushing comprising a container for molten glass having a corrugated bottom forming a plurality of ridges and grooves, said ridges having a generally flat surface and said grooves forming a space between adjacent ridges, insulating material filling each of said grooves, orifices positioned on said ridges and projecting therefrom, said orifices being in communication with the interior of said container to thereby permit molten glass to pass from said container through said orifices by gravity and means to connect said bushing to a molten glass source and means external of the bushing and in contact with said insulating material to provide mechanical support to the bottom of the bushing.

13. The bushing of claim 12 wherein the ridges contain at least two rows of bushing tips, the rows being staggered.

14. The bushing of claim 12 wherein the means to reinforce the bottom of the bushing are flat plate blades of a fin cooler.

15. The bushing of claim 12 wherein said bushing is flared from the bottom to the top to its point of attachment to the molten glass source.

16. The bushing of claim 12 wherein means are provided to provide a catalyst supply of gaseous fluid on the upper surfaces of said support member.

17. A fiber glass forming bushing suitable for high pressure forming comprising a container for molten glass, said container being provided with a corrugated bottom forming a plurality of ridges and grooves thereon, said ridges being closely spaced one from the other means in said grooves thermally insulating each of said ridges from the ridges adjacent thereto, a plurality of orifices projecting from each of said ridges, said orifices being arranged in rows and in fluid communication with the interior of said container to thereby permit glass to flow from said container and through said orifices, means to connect said container to a high pressure source of molten glass, and means to support the corrugated bottom of said bushing.

18. The bushing of claim 17 wherein the ridges have at least two rows of orifices.

19. The bushing of claim 18 wherein said orifices have a tip projecting therefrom.

20. The bushing of claim 17 wherein said orifices have tips projecting therefrom.

21. The bushing of claim 17 wherein the means to support said corrugated bottom is a fin cooler.

22. The bushing of claim 17 wherein said support means also provides gaseous coolant to said bushing.

* * * * *

UNITED STATES PATENT AND TRADEMARK OFFICE
CERTIFICATE OF CORRECTION

PATENT NO. : 4,351,656

DATED : September 28, 1982

INVENTOR(S) : Thomas H. Jensen

It is certified that error appears in the above-identified patent and that said Letters Patent are hereby corrected as shown below:

Column 6, claim 16, line 56 "catalyst" should be --constant--.

Signed and Sealed this

First Day of February 1983

[SEAL]

Attest:

GERALD J. MOSSINGHOFF

Attesting Officer

Commissioner of Patents and Trademarks